March 8, 1960  D. F. JENKINS ET AL  2,927,608
CONTROL VALVE FOR REGULATING BRAKE APPLYING PRESSURE
Filed Dec. 15, 1954

INVENTORS
MARTIN C. KLATT
DAVID F. JENKINS
BY- H.O. Clayton
ATTORNEY

United States Patent Office 2,927,608
Patented Mar. 8, 1960

2,927,608

CONTROL VALVE FOR REGULATING BRAKE APPLYING PRESSURE

David F. Jenkins and Martin C. Klatt, South Bend, Ind.

Application December 15, 1954, Serial No. 484,754
(Filed under Rule 47(b) and 35 U.S.C. 118)

7 Claims. (Cl. 137—620)

This invention relates in general to valves and particularly to valves adapted for use in an airplane or automotive wheel brake system of the power type.

Such brake systems, particularly those employed in heavy buses, trucks and in heavy airplanes, are usually provided with a high pressure power source to accommodate the system to vehicles of all weights; and it is an important feature of our invention to provide a control valve unit including an adjustable brake control valve and an adjustable pressure reducing valve operable to limit the inlet pressure to said brake control valve. Accordingly, the vehicle brake system including our control valve unit may be used in vehicles of all weights, the inlet pressure to the brake control valve of the unit being limited to a value obviating erosion, chatter and brake pressure surge or override of the system.

Yet another and important feature of our invention lies in the provision of a fluid pressure brake control valve unit including, in combination with the aforementioned pressure reducing valve, a brake control valve mechanism of the follow up and feel type. Such a valve mechanism enables the operator of the vehicle, with a minimum of physical and mental effort, to effectively obtain the desired application of the brakes whether it be a light or heavy application.

A further object of our invention is to provide a power brake control valve unit, said unit including an automatically operable fluid pressure reducing valve and a fluid pressure brake control valve mechanism comprising a combined manual and power operated inlet valve and a manual and power operated outlet valve.

Our invention also contemplates the provisions of a simple, compact and easily serviced and operated control valve unit adapted for use in a vehicle fluid pressure power brake system.

The above and other objects and features of our invention will appear more fully hereinafter from a consideration of the following description taken in connection with the accompanying drawings wherein a certain embodiment of our invention is illustrated by way of example.

Figure 1:
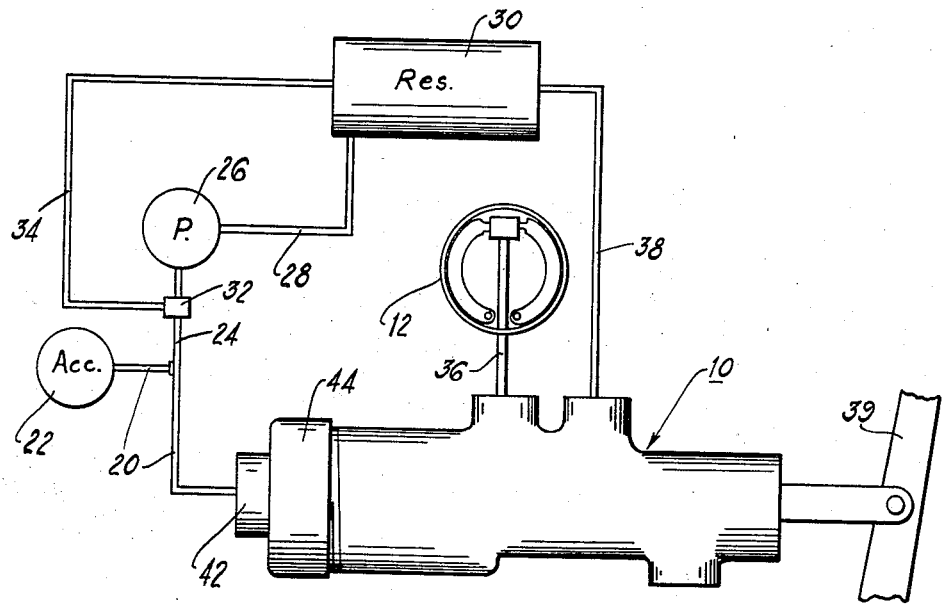
Figure 2:
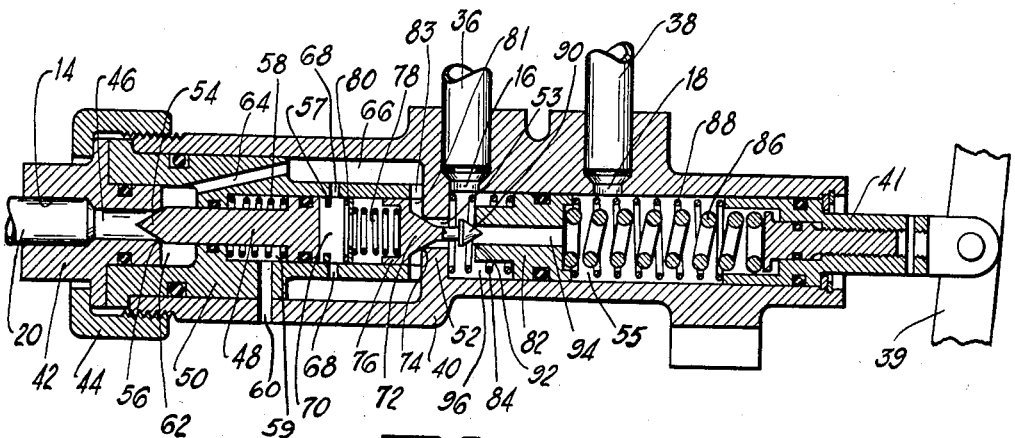

Figure 1 is a diagrammatic view of a hydraulic power brake system including the control valve unit constituting an important feature of our invention; and Figure 2 is a sectional view disclosing the details of the control valve unit of Figure 1.

There is described in the two figures of the drawing one embodiment of our invention wherein a control valve unit 10, Figure 1, serves to control a brake 12 of suitable design. This brake may constitute one of the brakes of any vehicle such as a heavy airplane or a heavy automotive bus or truck. If the control valve unit 10 of our invention is used in the four wheel brake system of an automotive vehicle having four brakes, such as the brake 12, are controlled by one valve unit 10. On the other hand, if the control valve unit 10 is employed to control the brakes of an airplane then there is provided, as disclosed in Figure 1, but one control valve unit and its operating means for each wheel of the airplane. Such a brake system for airplanes is well suited not only to brake, that is decelerate, a moving airplane to a stop or slow it down, but also to steer the airplane when the same is taxied on the ground; hence the necessity for a separate brake and applying means, that is pedal or lever, for each wheel.

Referring to the two figures of the drawing the control valve unit 10 includes an inlet port 14, an outlet port 16 and a return port 18; and the power fluid of the brake system, preferably a liquid such as oil or its equivalent, flows through these ports. The brake system, including the control unit 10, may however use any suitable power fluid such as compressed air. The system disclosed in the drawings is a hydraulic system.

Referring to Figure 1, the inlet port 14 is connected, by a suitable conduit 20, with an accumulator 22, and the latter is connected, by a conduit 24, with a hydraulic pump 26; and the pump is connected, by a conduit 28, with a reservoir 30. The pump builds up the fluid pressure of the accumulator to say 3,000 p.s.i. and when this pressure is exceeded, a relief valve 32 is operative to circuit the fluid from the pump to the reservoir 30 via a conduit 34. The outlet port 16 of the control valve unit 10 is connected to the brake 12 by a conduit 36 and the return port 18 of said unit is connected to the reservoir by a conduit 38. The brake 12 when employed as a part of the brake system of an airplane is preferably of the disc type.

Referring now to Figure 2 disclosing the details of the control valve unit of our invention this unit preferably includes a two diametered casing 40 capped at one end by a two part cap or closure member 42, 44 and closed at its other end by a manually operated slidable closure member 41 of two parts. The latter member is moved to the left, Figure 2, to operate the valve mechanism, by a foot or hand operated member such as a pedal 39. The cap member 42 is centrally bored to provide the inlet port 14 and is also bored to provide a fluid transmitting duct 46 registering with the port 14. A pressure reducing or cut off valve preferably of the needle type, includes a cylindrically shaped two diametered pin 48 journaled in a two diametered cylindrically shaped sleeve member 50 fixedly mounted in the casing 40. The member 50 is positioned between and in contact with a partition 52 and the cap member 42 the latter member and sleeve 50 being secured in place by the cap member 44 which is preferably screw threaded to the end of the casing. The partition 52 is provided with an opening 53 and this partition, together with portions of the casing 40 and the closure members 41 and 42, 44, outline compartments to receive the valve mechanism described hereinafter.

Continuing the description of the pressure reducing valve the pin 48 is preferably provided with a cone shaped end 54 which is adapted to seat upon a valve seat portion 56 of the cap member 42. This valve seat portion 56 and coned end portion 54 together constitute the power operated pressure reducing valve of our invention. The valve operating member 48 is biased to the right against a stop 57 by a preloaded spring 58 disposed in a chamber 59, said spring serving to force the valve part 54 away from the valve seat 56, the degree of separation being limited by the stop 57 which is secured to the sleeve 50. The chamber 59 is vented to a suitable low pressure drain source such as the atmosphere via passage 60. The valve 54, 56 is accordingly opened by the operation of the spring 58; and said valve is closed by the force exerted by the power fluid acting on the large diametered end of the pin 48. This valve is adjustable by varying the ratio of the area of the cone shaped end 54 subjected to fluid pressure, and the large diametered end of the pin 48. Describing the closing of the pressure reducing valve, the power fluid, that is oil or its equivalent, flows from the accumulator 22, thence through the conduit 20 into the inlet port 14, thence through the open valve 54, 56 and into a chamber 62. From the chamber 62 the power fluid flows through a duct 64 in the member 50 thence into a chamber 66, thence through ports 68 in the member 50, and into a chamber 70. The fluid in the chamber 70 acts directly upon the large diametered end of the pin 48 to seat the valve. The latter is seated when the pressure exerted by the fluid reaches a certain value the preloaded spring 58 being overcome and further compressed. The closing of the valve 54, 56 is a function of the size of the spring 58 and the ratio of the area of the cone shaped end portion 54 subjected to the pressure of the power fluid and the right end face, Figure 2, of the member 48; and the closing of the valve is also a function of the resistance offered by air within the compartment housing the spring 58.

Describing now the follow up and feel brake control valve mechanism of our valve unit this mechanism constitutes a combined manually and power operated follow up inlet valve and manually and power operated return valve.

The follow up inlet valve comprises a cone shaped movable valve member 72 adapted, with the valve closed, to seat upon a valve member 74 the latter constituting a valve seat portion of the partition 52 outlining the opening 53. To the valve member 72 there is secured a sleeve member 76 reciprocably mounted within the sleeve 50, the member 76 and valve member 72 being biased to the right to seat the latter member, by a preloaded valve return spring 78. The spring 78 at one of its ends is in abutment with a stop 80 secured to the member 50. The brake fluid under pressure is admitted to a chamber 81 via ports 83 in the member 50 said fluid passing through the opening 53 when the valve 72, 74 is opened. The normally closed manually and power operated follow up inlet valve 72, 74 is opened by the manual operation of a cylindrically shaped piston member 82 slidably mounted within the valve unit. The piston member 82 is biased to the right, Figure 2, by a relatively weak preloaded piston return spring 84. Spring 86 and 88, which are preferably not preloaded, are interposed between the two part closure member 41 and the piston 82. One or more springs are used depending upon space limitations.

The manually and power operated outlet valve of our invention includes a cone shaped valve member 90 secured to the inlet valve member 72 said member 90 being adapted to seat upon a valve seat member 92 constituting a portion of the end of the cylindrically shaped piston member 82. The interior of the member 82 provides a duct 94 interconnecting a chamber 55 and a chamber 96. The operation of the outlet valve 90, 92 is described hereinafter. This valve, which is disclosed in its open, that is brake off position in Figure 2, is closed in the operation of opening the follow up inlet valve 72, 74.

Describing now the operation of the entire mechanism of our invention assuming the pump 26 to be running, the accumulator 22 charged, and the brake operated pedal 39 in its brake off position, the valve parts assume the positions disclosed in Figure 2, that is the pressure reducing valve 54, 56 is closed, the inlet valve 72, 74 is closed, the outlet valve 90, 92 is open; and the brake shoes or equivalent friction means of the brake 12 are in their brake off position. The purpose of the spring 58 is to hold the pressure reducing valve 56 open when the system is not charged. Once the pump charges the system, the pressure is transmitted across the reducing valve 54, 56 and the pressure in chamber 62 becomes a fixed proportion of the pressure developed by the pump. The pressure reducing valve 54, 56 will automatically close once the pressure in chamber 62 has attained a certain proportion of the pressure developed by pump 26. The pressure reducing valve is closed at this point against the resistance of spring 58. It will also be assumed that the spring 78 together with the fluid under pressure are capable of exerting a maximum load of say 50 pounds on the seated valve member 72. This load is, in fact, exerted when the brake pedal 39 is in its released position.

Assuming then that the pilot of the airplane wishes to apply the brake 12 to effect say a steering or brake operation, he will depress the pedal 39 with an initial load of say 40 pounds thereby moving and compressing the springs 86 and 88 and moving the piston 82 to the left Figure 2, as a unit; and this operation serves to close the valve 90, 92 and incidently further compress the return spring 84. The degree of movement of the piston 82 and springs 86 and 88 to close the valve 90, 92 is determined by the adjustment of the closure 41. The spring 84 is weaker than the springs 86 and 88. After the valve 90, 92 is closed continued depression of the brake pedal, with a load of say 51 pounds, serves to open the valve 72, 74 the return spring 78 being further compressed; and it is to be noted here that the spring 78 is weaker than the springs 86 and 88. The opening of the valve 72, 74 results in a flow of power fluid from the accumulator 22 to the brake 12 to take up the clearance between the brake shoes or their equivalent and the brake drum or its equivalent of the brake mechanism. In this operation the pressure of the fluid in the chamber 66 is reduced.

As the lining clearance of the brake is being taken up the fluid pressure in the chamber 66 and 96 is greatly reduced and thereafter begins to build up only after the fluid displacement to the brake is substantially completed. It will be assumed that the pilot starts a brake application by pushing on the pedal 39 with whatever force is required to achieve the desired deceleration. This pedal movement will develop pressure in chamber 66 and connected chamber 70 and for purposes of illustration let us assume this is a value sufficient to effect a 40 pound load on the valve member 72. The springs 86 and 88 are then compressed and the valve 90 is moved to its closed position. The pressure chamber 66 is transmitted to the brakes until follow up operation of the valve 72, 74 terminates this communication of pressure to the brakes at which time the brake-applying pressure has attained a certain force depending upon and proportional to the force exerted by the brake pedal. This pressure communicated to the brakes continues until the force on the pedal 39 is relaxed whereupon valve 90 is opened to release the brake-applying pressure.

In the operation of the brakes the amount of pressure to which the brake shoes are subjected is determined by the degree of load imposed upon the brake pedal.

If the pilot desires to increase the brake applying pressure whereupon he repeats the above described operation, the load on the brake pedal 39 being increased to say 100 pounds with a proportional increase in the application of the brakes. The aforementioned substantial increase in pedal load to effect the second increment of brake application is made necessary by the force exerted by the fluid within the chamber 96.

The brake 12 may then be applied up to its maximum load said load being determined by the setting of the adjustable pressure reducing valve 54, 56 and cooperating parts. At this maximum load the valve 72, as stated above, is loaded by a force of say 50 pounds.

To release the brake 12 the pilot will release the brake pedal 39 thereby permitting the return spring 84 to open the outlet valve 90, 92; and this operation results in a flow of fluid from the brake 12 to the reservoir via the conduit 36, port 16, chamber 96, duct 94, port 18 and conduit 38.

It is also to be noted that in the operation of applying the brake 12 the operator, that is the pilot of the airplane, is advised of the increase in the degree of operation of the brake by the progressive increase in resistance to the depression of the brake pedal. This progressive increase or reaction is usually defined as the feel of the brake applying mechanism and is explained when it is noted that the power fluid acting upon the brake concurrently acts, through the intermediary of the piston 82 and the springs 86 and 88, upon the brake pedal. Thus as the brake pressure increases so does the force opposing the depression of the brake pedal that is the force necessary to maintain said pedal in its advanced position.

We claim:

1. A control valve unit adapted to be incorporated in a vehicle brake system said unit including, in combination, a casing having an inlet port, an outlet port and a return port, and valve means within the casing including a pressure reducing valve for controlling the fluid pressure of the power fluid entering the control valve unit through said inlet port, and further including a combined inlet and return valve mechanism which is in series with said reducing valve and is thereby constructed and arranged for controlling the fluid pressure transmitted through the outlet port from a chamber containing fluid pressure which is maintained at a constant proportion of pressure from a pressure source, and means for exhausting the fluid from the brake through said return port.

2. A control valve unit including a casing having a fluid receiving inlet port, a fluid receiving outlet port and a fluid receiving return port, a closure member closing one end of the casing and another closure member closing the other end of the casing, a partition member within the casing, said partition, together with parts of the casing and the closure members, outlining two compartments, valve mechanism within said casing including a fluid pressure controlling valve housed within one of the aforementioned compartments and operable, when the fluid entering the inlet port is subjected to a certain pressure, to cut off the inlet port from one of said compartments, and a control valve mechanism having a portion thereof housed within one compartment and another portion thereof housed within the other compartment, said control valve mechanism being operable to control the flow of power fluid from the outlet port to the return port.

3. A control valve unit including a casing having a fluid receiving inlet port, a fluid receiving outlet port and a fluid receiving return port, a closure member closing one end of the casing and another closure member closing the other end of the casing, an orificed partition member within the casing said partition, together with parts of the casing and the closure members, outlining two compartments, valve mechanism within said casing including a fluid pressure controlling valve housed within one of the compartments and operable, when the fluid entering the inlet port is subjected to a certain pressure, to cut off the inlet port from the latter compartment, and a control valve mechanism having a portion thereof housed within one compartment and another portion thereof housed within the other compartment said control valve mechanism being operable to control the flow of power fluid from the outlet port and to control the flow of power fluid from the outlet port to the return port, said control valve mechanism including an inlet valve member having a part thereof adapted to cooperate with a part of the partition constituting the aforementioned orificed portion thereof to thereby provide an inlet valve, said control valve being operable responsively to the pressure regulated by said fluid pressure controlling valve.

4. A control valve unit including a casing having a fluid receiving inlet port, a fluid receiving outlet port and a fluid receiving return port, a closure member closing one end of the casing and another closure member closing the other end of the casing, a partition member within the casing, said partition having an opening therein and together with parts of the casing and closure outlining two compartments, valve mechanism within said casing including a fluid pressure controlling the valve housed within one of the compartments and operable, when the fluid entering the inlet port is subjected to a certain pressure, to cut off the inlet port from one of said compartments, and a control valve mechanism having a portion thereof housed within one compartment and another portion thereof housed within the other compartment, said control valve mechanism being operable responsively to pressure regulated by said fluid pressure control valve to control the flow of power fluid from the outlet port and to control the flow of power fluid from the outlet port to the return port, said control valve mechanism including an inlet valve member having a part thereof adapted to cooperate with a part of the partition outlining the aforementioned opening therein to thereby provide an inlet valve, said control valve mechanism further including an outlet valve comprising a valve member reciprocable within one compartment of the valve unit, and spring means housed within said latter compartment and confined between one end of said compartment and one end of the reciprocable valve member.

5. A control valve unit comprising a casing, a pressure source for said unit, an inlet connecting said control valve unit with said pressure source, a first chamber within said casing, a pressure reducing valve arranged within said casing and responsive to the pressure in said first chamber for maintaining the pressure within said first chamber at a fixed proportion of the pressure from said pressure source, an outlet from said first chamber, an outlet valve arranged within said casing for controlling fluid flow through said outlet, a spring loaded piston operatively combined with said outlet valve and arranged to operate said outlet valve, said piston being responsive to the pressure in said first chamber and arranged to actuate said outlet valve in accordance with actuating force developed on said spring loaded piston, and a relief valve also combined with said spring loaded piston and operated thereby for relieving the pressure transmitted across the outlet when the actuating force on said piston is relieved.

6. A control valve unit according to claim 5 including spring means combined with said piston to bias the piston in a direction permitting closure of said outlet port when the brake-applying effort is relieved, a return port, and means interconnecting said outlet with said return port, said relief valve serving to control communication between said outlet port and said return port.

7. A control valve according to claim 6 in which the piston is movable in one direction by operator developed force exerted through said springs to unseat said outlet valve, said outlet valve being automatically closed when the pressure metered across said outlet valve equalizes said applying force.

References Cited in the file of this patent

UNITED STATES PATENTS

| | | |
|---|---|---|
| 2,069,540 | Sanford | Feb. 2, 1937 |
| 2,137,954 | Sanford et al. | Nov. 22, 1938 |
| 2,173,940 | Hewitt | Sept. 26, 1939 |
| 2,231,331 | Griffith et al. | Feb. 11, 1941 |
| 2,656,014 | Fites | Oct. 20, 1953 |
| 2,671,463 | Baldwin | Mar. 9, 1954 |
| 2,812,218 | Fitch | Nov. 5, 1957 |

FOREIGN PATENTS

| | | |
|---|---|---|
| 781,222 | France | 1935 |